(12) United States Patent
Brown et al.

(10) Patent No.: US 7,991,044 B1
(45) Date of Patent: Aug. 2, 2011

(54) SYSTEM AND METHOD FOR AUTOMATIC DIAGNOSIS OF IMPAIRMENTS IN A DIGITAL QUADRATURE AMPLITUDE MODULATED SIGNAL

(75) Inventors: Clifford Brown, Alpharetta, GA (US); James E. Barker, Lawrenceville, GA (US)

(73) Assignee: Sunrise Telecom Incorporated, San Jose, CA (US)

( * ) Notice: Subject to any disclaimer, the term of this patent is extended or adjusted under 35 U.S.C. 154(b) by 3481 days.

(21) Appl. No.: 09/722,168

(22) Filed: Nov. 22, 2000

(51) Int. Cl.
*H04B 3/46* (2006.01)

(52) U.S. Cl. ...................................................... 375/226

(58) Field of Classification Search .......... 375/224–228, 375/346, 371
See application file for complete search history.

(56) References Cited

U.S. PATENT DOCUMENTS

| 4,381,546 | A | | 4/1983 | Armstrong | |
|---|---|---|---|---|---|
| 4,771,438 | A | * | 9/1988 | Nash | 375/235 |
| 4,918,708 | A | * | 4/1990 | Pottinger et al. | 375/228 |
| 5,602,601 | A | * | 2/1997 | Kim et al. | 348/607 |
| 6,385,237 | B1 | * | 5/2002 | Tsui et al. | 375/228 |
| 6,560,294 | B1 | * | 5/2003 | Gatherer | 375/261 |

* cited by examiner

*Primary Examiner* — Kevin Y Kim

(57) ABSTRACT

A device and methods for automatically diagnosing impairments in a digital quadrature amplitude modulated signal is disclosed. The impairments include phase noise, compression, coherent interference, and non-coherent interference. The device comprises a phase noise detector, a compression detector, and an interference detector. The phase noise detector detects phase noise by analyzing data points of an amplitude quadrature modulated constellation for orthogonal deviations from ideal points. The compression detector detects compression by analyzing the magnitudes of vectors from the constellation's origin to data points of the constellation. The interference detector detects coherent and non-coherent interference by detecting error signals in the data points and then analyzing the distribution of the error signals.

54 Claims, 17 Drawing Sheets

CONSTELLATION
DISPLAY

PHASE NOISE

COMPRESSION

COHERENT INTERFERENCE

NON-COHERENT
INTERFERENCE

SYSTEM AND METHOD FOR AUTOMATIC DIAGNOSIS OF IMPAIRMENTS IN A DIGITAL QUADRATURE AMPLITUDE MODULATED SIGNAL

FIELD OF THE INVENTION

The present invention relates generally to automatic detection of impairments in a digital quadrature amplitude modulated signal. More particularly, the present invention relates to a system and method for automatically detecting phase noise, compression, coherent interference, and non-coherent interference in a digital quadrature amplitude modulated signal.

BACKGROUND OF THE INVENTION

Originally cable networks were established to transmit television signals to homes and offices. Cable networks provided advantages over transmission television networks that included providing a clearer signal and a greater selection of channels. These networks were made up of co-axial cables routed in a tree and branch structure to customer sites and were intended simply to provide customers with analog television signals.

More recently, cable networks have been converted to transmit digital signals in a hybrid of fiber optic cable and co-axial cable structures. These converted networks accommodate not only traditional, analog television signals but also digital television signals and digital data signals. Digital television signals provide a crisper, more detailed picture along with enhanced sound. With the capability to transmit digital data signals, cable networks may now be coupled to the Internet thereby providing houses and offices access to the Internet. This Internet access is generally faster than access provided by other technologies.

With digital signals, cable networks utilize a form of digital quadrature amplitude modulation ("QAM") which provides high speed data transmission in a relatively narrow broadcast band. QAM typically transmits a serial data stream in groupings of multiple bits. QAM uses a combination of amplitude variation and phase angles to encode the bits on a carrier.

One form of QAM, commonly referred to as 64-QAM, transmits six bits at a time. 64-QAM encodes a first set of three bits by amplitude modulating them over eight amplitude levels evenly arrayed about zero. Simultaneously, 64-QAM similarly encodes the second set of three bits. 64-QAM amplitude modulates the first set of bits on a carrier, and simultaneously amplitude modulates the second set of bits on a 90° phase shifted version of the same carrier. 64-QAM then combines the two carriers for transmission. At the receiver, the two signals are separated and the bits decoded. 64-QAM has 64 combinations of amplitude and phase angle; each combination constitutes a symbol.

An alternative form of QAM is 256-QAM where eight bits are encoded into eight bit symbols as two groups of four bits. The technique for 256-QAM is otherwise the same as for 64-QAM. 256-QAM has 256 combinations of amplitude and phase angle; each combination constitutes a symbol.

The two sets of encrypted bits that comprise a QAM signal are referred to as the I component and the Q component, respectively. These are the component signals before the Q component is frequency modulated with at 90° phase angle and combined with the I component. The I component is the encoded first set of three bits, or four bits for 256-QAM, and the Q component is the encoded second set of three bits, or four bits for 256-QAM.

When testing a cable network, it is common to display the I and Q components in a display known as a constellation. FIG. 1 is an illustration of an exemplary constellation for 64-QAM without extraordinary degradation of the QAM signal. The constellation for 64-QAM has 64 groupings of points in the 8×8 matrix; for 256-QAM, the constellation has 256 groupings of points in a 16×16 matrix. The groupings of points are frequently referred to as "cells."

To generate a constellation, a test device plots the location of the received symbols on a coordinate axes. When plotting the received symbols, the horizontal axis represents the I component of the signal, and the vertical axis represents the Q component of the signal. Once plotted, the symbol becomes a datum point of the constellation.

The constellation is divided into 64 square cells, or 256 square cells in 256-QAM. There is a cell for each symbol of the 64-QAM signal. In an ideal network, the received symbol would plot exactly in the middle of its cell in the constellation. FIG. 1 shows the data points distributed about the ideal center point of each cell. This dispersion indicates noise or impairments in the network.

As FIG. 1 shows, cable networks are not ideal. From an analysis of the constellation, however, it is possible to glean information about impairments in a cable network. Once identified, these impairments may be corrected or lessened. Four common defects that occur in cable networks are phase noise, compression, coherent interference, and non-coherent interference.

FIG. 2 shows a constellation for a network where phase noise is present. Phase noise consists of deviations from the ideal phase angles of 90°, which QAM uses when combining the I and Q components. Phase noise distorts the constellation such that it appears to be twisted about the origin. FIG. 2 shows an extreme case of phase noise where its presence is readily apparent.

Another defect in the signal on a network is compression. Compression occurs when one or more amplifiers in the network do not accurately reproduce their input signal. FIG. 3 shows a constellation where the signal is extremely compressed. Compression is evident because the cells at the outer corners of the constellation appear to be pushed toward the origin. The constellation takes on the appearance of being bent around a sphere.

Coherent interference is yet another possible defect in the network. A carrier signal interfering with the digitally modulated QAM signal causes coherent interference. FIG. 4 shows the constellation where the signal has experienced extreme coherent interference. The degraded QAM signal appears in the constellation as symmetrical deviations from the ideal center point. As FIG. 4 shows, for any one cell, the points are arrayed symmetrically around a void at the center of the cell.

The final possible defect in the network that is addressed here is non-coherent interference; one common form of non-coherent interference is laser clipping. Non-coherent interference occurs when a driver in the network attempts to exceed its output range. That is the total signal power exceeds the ability of the driver to replicate the signal. Non-coherent interference appears in the constellation as stray points away from the clusters within the cells. FIG. 5 shows a constellation where non-coherent interference is present in the signal.

Until now, technicians have had to diagnose phase noise, compression, coherent interference, or non-coherent interference in a network by a manual observation of the constellation. As FIGS. 1-5 show, when extreme cases of these defects are present, a technician can readily identify their presence. The situation is much more difficult when the defects are not extreme. In less extraordinary situations, a technician may not be able to identify the presence of these defects in the network. This difficulty is compounded when more than one of the defects is present. Multiple defects can interact thereby masking their presence to a technician who simply observes a constellation. It becomes extremely difficult for a technician to troubleshoot accurately and efficiently a network simply by observing its constellation.

There is a compelling need for systems and methods capable of troubleshooting accurately and automatically cable networks.

SUMMARY OF THE INVENTION

The present invention provides a system and methods to identify impairments in digital quadrature amplitude modulated signals that are an improvement over the prior art. The present invention provides a system that comprises a phase noise detector, a compression detector, and an interference detector. The system is preferably embodied in a hand-held test device. A technician may take to the tester to any point on a cable network. The tester preferably monitors traffic on the cable network to construct a constellation of the quadrature amplitude modulation symbols. The tester will use this constellation for analysis to detect impairments. By monitoring the network, the tester does not disturb traffic already on it and does not pre-empt band width to conduct tests.

The phase noise detector comprises a sorter, rotator, and comparator. The sorter selects data points for analysis, and the comparator determines the orthogonal deviations of the data points from an ideal point. The rotator eases the determination function of the comparator.

The compression detector comprises a sorter and X/Y deviation determinator. The sorter selects data points for analysis, and the X/Y deviation determinator. In the preferred embodiment, the X/Y deviation determinator compares the magnitudes of vectors from the origin to each datum point to detect compression. In an alternative embodiment, the X/Y deviation determinator detects compression by comparing the average coordinates of data points that the sorter has sorted into cells of the constellation.

The interference detector comprises a sorter, an error calculator, a distribution chart, and a data peak detector. The sorter selects data points of a constellation for analysis. The error calculator determines error values for each selected data point. An error point is the Euclidian distance between the datum point and its corresponding ideal point. The distribution chart processes the error values into a histogram. The data peak detector analyzes the histogram for deviations from a gaussian distribution. Based on the form of deviations from the gaussian distribution, the data peak detector detects coherent interference and non-coherent interference.

The present invention also provides methods for detecting phase noise, compression, coherent interference, and non-coherent interference in a quadrature amplitude modulated signal.

BRIEF DESCRIPTION OF THE DRAWINGS

FIG. 11 is a block diagram of a histogram.

DETAILED DESCRIPTION OF THE INVENTION

The present invention provides a system and method for automatically determining the presence of phase noise, compression, coherent interference, or non-coherent interference in a digital quadrature amplitude modulated signal. The present invention advantageously analyzes automatically the constellation generated from the QAM signal to detect the presence of these defects. The present invention is applicable to any digital quadrature modulated signals and may include signals on fiber optic networks, co-axial cable networks, or fiber optic, co-axial cable hybrid networks.

Figure 1:
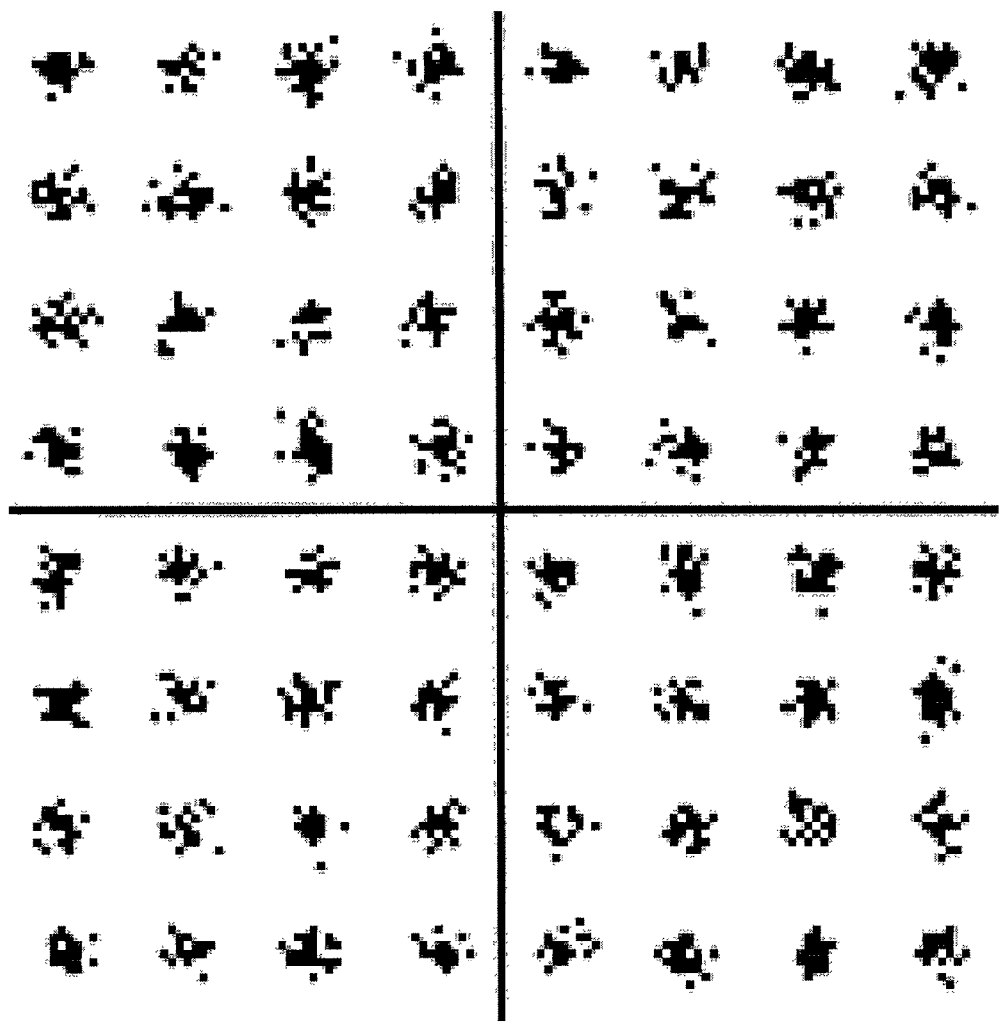
FIG. 1 is a drawing of an exemplary constellation for a 64-QAM signal.
Figure 2:
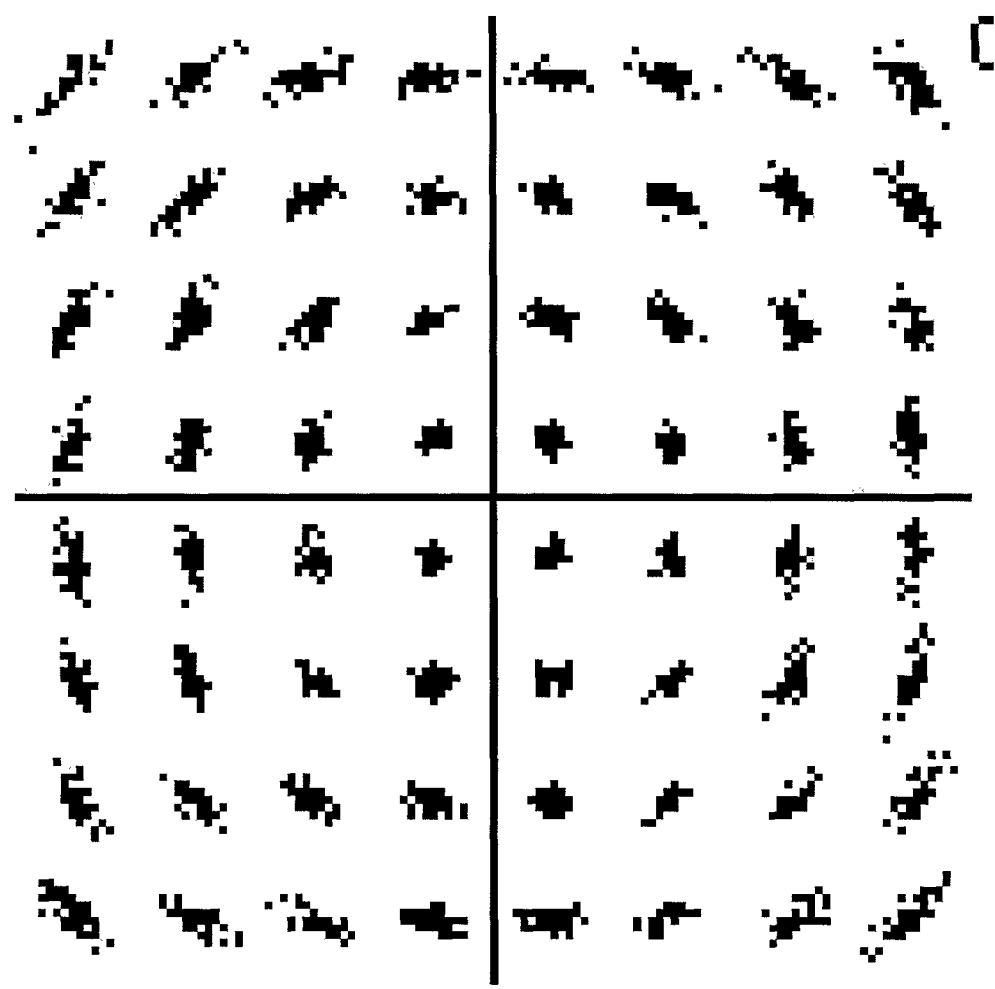
FIG. 2 is a drawing of an exemplary constellation for a 64-QAM signal with phase noise.
Figure 3:
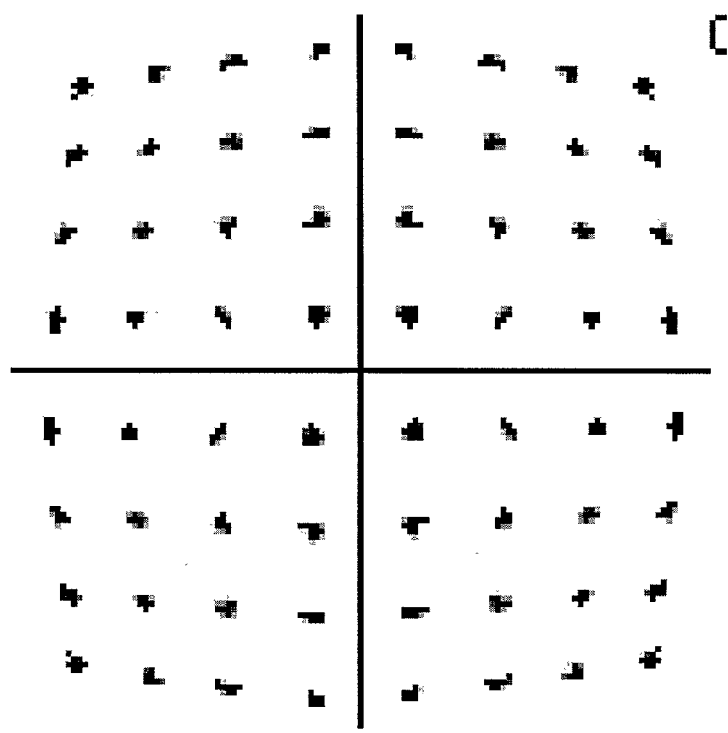
FIG. 3 is a drawing of an exemplary constellation for a 64-QAM signal with compression.
Figure 4:
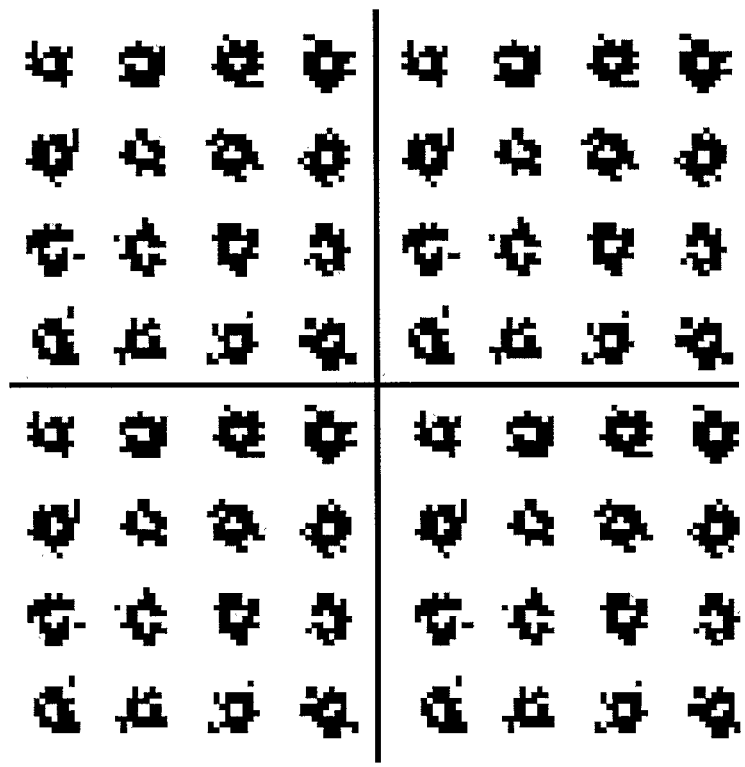
FIG. 4 is a drawing of an exemplary constellation for a 64-QAM signal with coherent interference.
Figure 5:
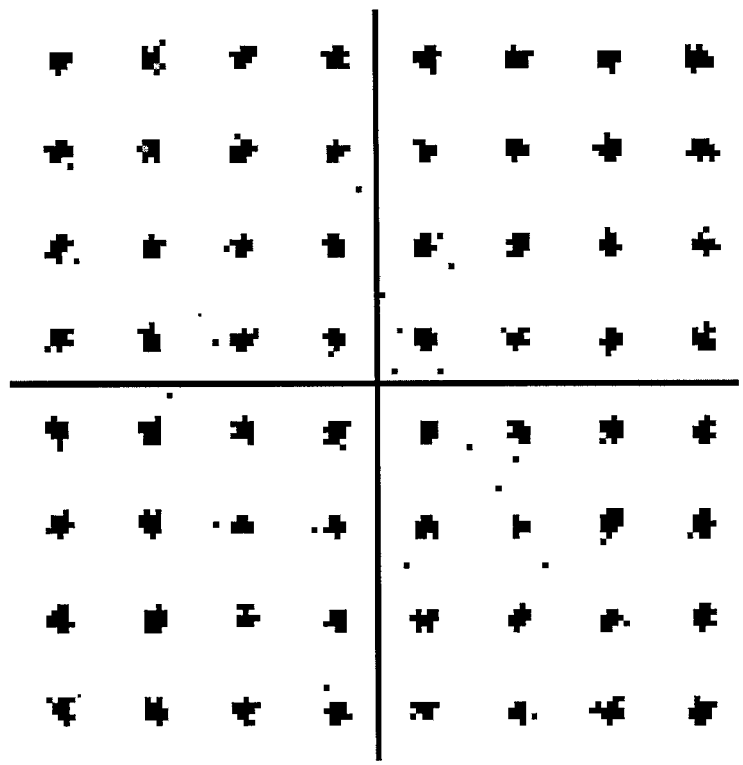
FIG. 5 is a drawing of an exemplary constellation for a 64-QAM signal with non-coherent interference.
Figure 6:
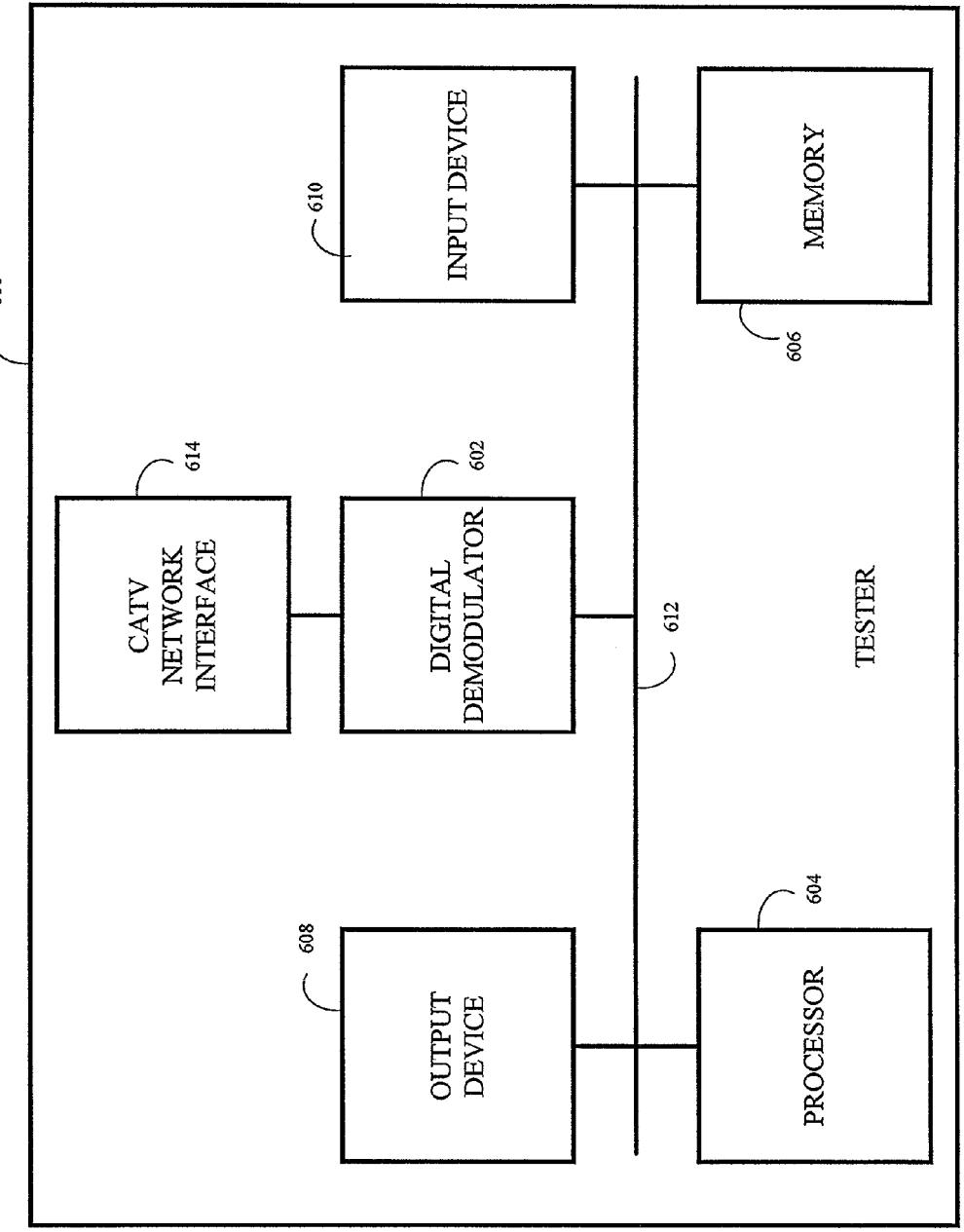
FIG. 6 is a block diagram of the preferred embodiment of the present invention.

FIG. 6 shows the preferred embodiment of the system of the present invention. The present invention is embodied in a tester 600 that is preferably hand-held or portable. The tester 600 comprises a CATV network interface 614, a digital demodulator 602, a processor 604, a memory 606, an output device 608, and an input device 610. A conventional bus 612 couples digital demodulator 602, processor 604, memory 606, output device 608, and input device 610. Those of ordinary skill in the art will also realize that, while this description of the present invention refers primarily to 64-QAM, the present invention, however, applies equally to 256-QAM and to any other level of digital amplitude quadrature amplitude modulation.

CATV network interface 614 is a conventional device for physically coupling a device to a cable network. CATV network interface 614 provides a physical port for transmitting and receiving optical signals. CATV network interface 614 is coupled to digital demodulator 602. Digital demodulator 602 is a conventional modulator for receiving signals from a cable network. Digital demodulators are available from Broadcom Corporation of Irvine, Calif. In an alternate embodiment, a cable modem serves in place of digital demodulator 602. A cable modem is a device that is capable of receiving and transmitting signals on a cable network. Cable modems are available from Broadcom Corporation.

Processor 604 is a conventional microprocessor for executing instructions in computer or an electronic device. Microprocessors are available from Intel Corporation of Santa Clara, Calif., from Motorola, Inc. of Schaumburg, Ill., or from many other manufacturers. In some cases, microprocessors are integrated, along with other circuits, into custom, commercially available application specific integrated circuits. Memory 606 is preferably a conventional static random access memory device but alternatively may be any memory device including, but not limited to, a cd-rom, a read only memory, a dynamic random access memory, a hard drive, a floppy drive, a magnetic tape, a programmable read only memory, an electronically programmable read only memory, an erasable electronically programmable read only memory, or a flash memory. Those of ordinary skill in the art will recognize that memory 606 may be any type of data storage device. Memory 606 is uniquely programmed with instructions that, when executed by processor 604, implement the present invention. Memory 606 also stores data necessary for the tester 600 to analyze a signal from the network.

Output device 608 is a conventional output device for displaying data such as a liquid crystal display or cathode ray tube. Input device 610 is a conventional input device for inputting data and commands into an electronic device or computer. Exemplary input devices include a keyboard, a keypad, or a mouse.

Figure 7:
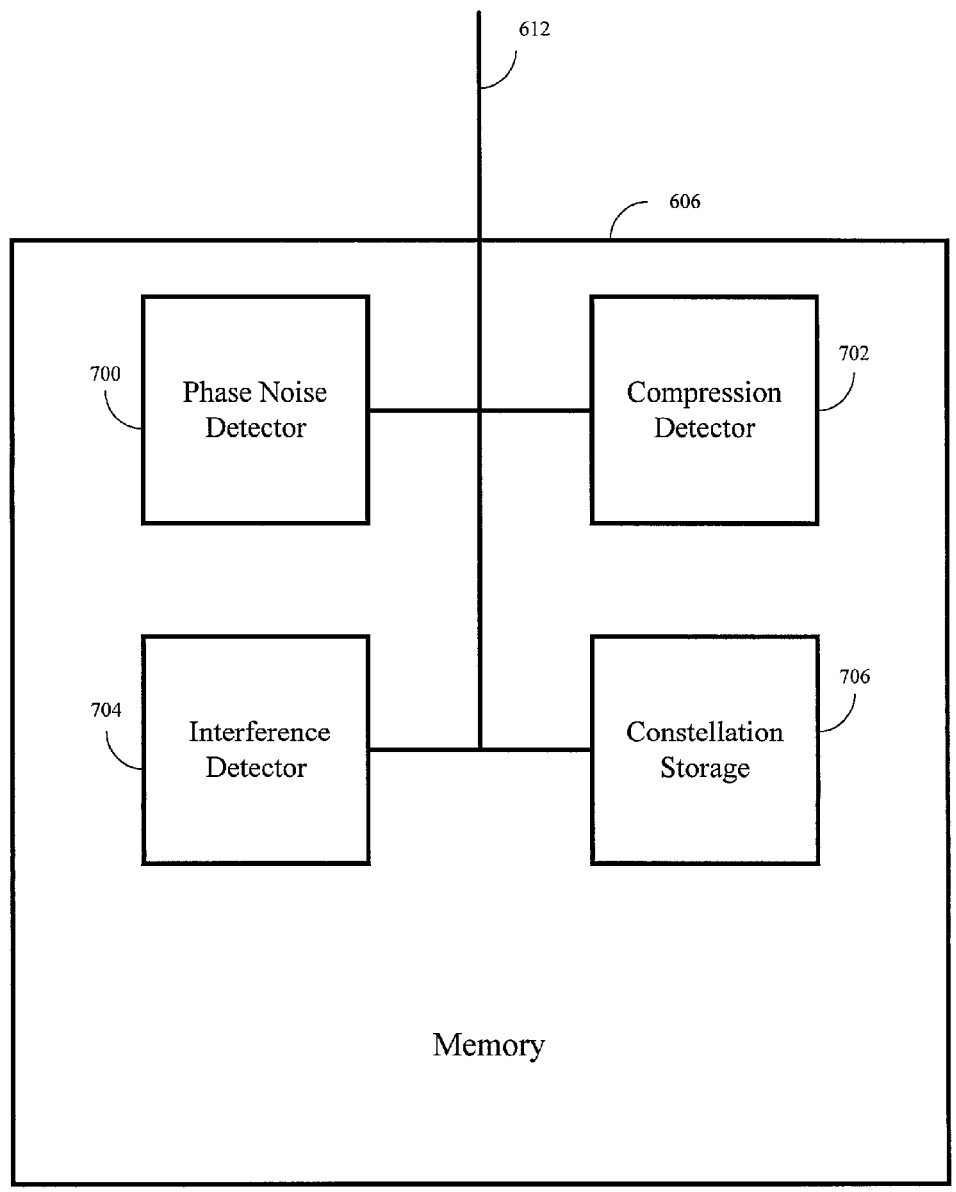
FIG. 7 is a block diagram of the memory of the preferred embodiment of the present invention.

FIG. 7 shows the memory 606 in greater detail. The memory 606 comprises a phase noise detector 700, a compression detector 702, an interference detector 704, and a constellation storage 706. The phase noise detector 700, compression detector 702, interference detector 704, and constellation storage 706 are all coupled to the bus 612.

Those of ordinary skill in the art will recognize that the phase noise detector 700, compression detector 702, interference detector 704, and constellation storage 706 are all sections of the memory 606. The phase noise detector 700, compression detector 702, and interference detector 704 store program instruction steps which, when executed by processor 604, implement a component of the present invention. The constellation storage 706 stores data that comprises a constellation. The tester 600 preferably includes systems and methods for receiving QAM signals from the cable network and may include systems and methods from transmitting QAM signals on the cable network. These systems are capable of generating a constellation that is stored in the constellation storage 706. The present invention preferably monitors the cable network and uses existing signals to generate the constellation. In this preferred mode, the present invention does not disturb traffic on the cable network and does not preempt bandwidth to conduct tests. In an alternate and less preferred embodiment, the tester 600 generates a QAM signal comprising all possible QAM symbols which it transmits on the cable network with an instruction for a distant network element to return the signal. The tester 600 then constructs the constellation from the returned signal.

Figure 8:
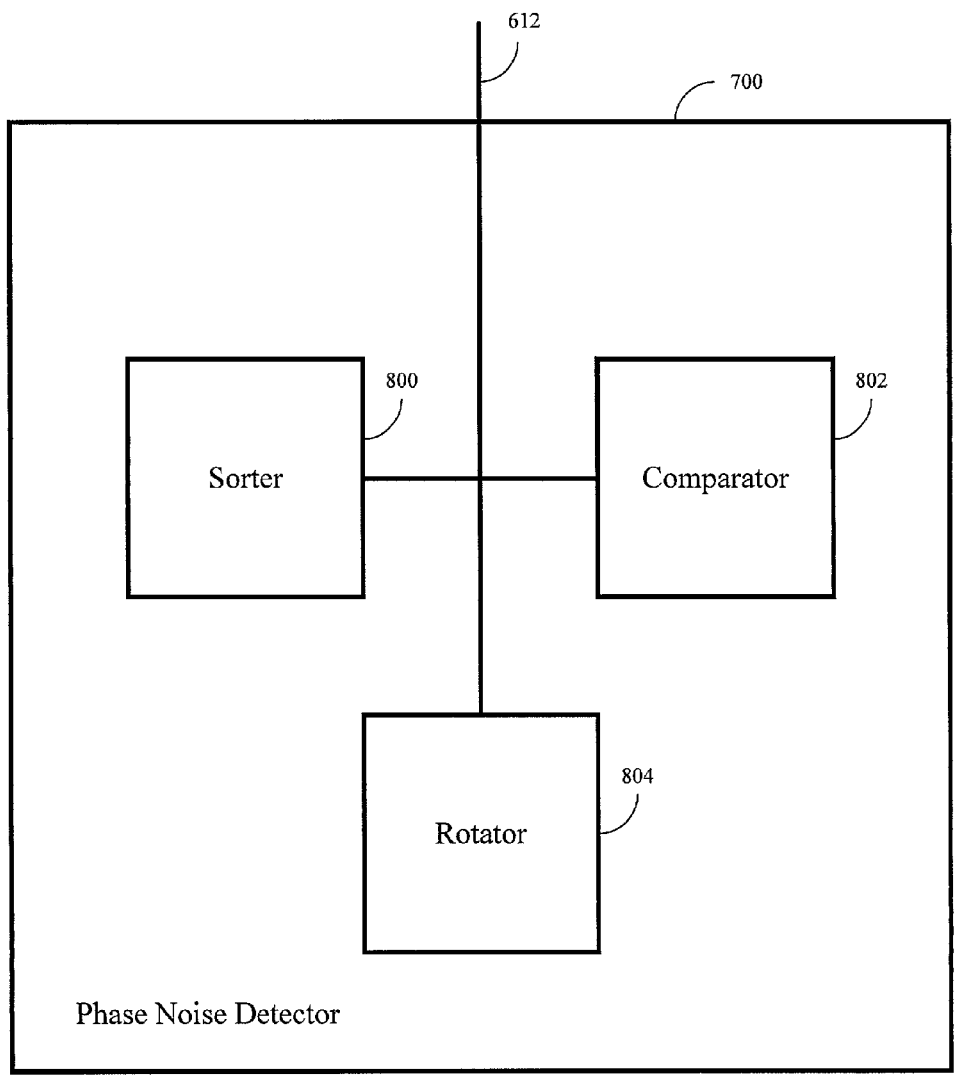
FIG. 8 is a block diagram of the phase noise detector of the present invention.

FIG. 8 illustrates the phase noise detector 700 in greater detail. The phase noise detector 700 comprises a sorter 800, a comparator 802, and a rotator 804.

The sorter 800 accesses the constellation stored in the constellation storage 706 and sorts its data points into cells. For 64-QAM, the sorter 800 sorts the constellation by laying an 8×8 grid over the constellation. The grid is arranged so that the center of each square is the ideal point for each signal level of the QAM signal. The sorter then assigns each datum point to the cell represented by the square in which the datum point lies.

Having sorted the constellation, the sorter 800 generates a signal to the rotator 804 indicative of the data points in the cells at the four corners of the constellation, the cells furthest from the origin of the constellation. For each corner cell, the rotator 804 constructs a vector from the origin to each datum point. Having constructed the vectors for a cell, the rotator 804 rotates the vectors so that an ideal vector, a vector from the origin to the center of the cell, would be vertical. For the cell in the upper, right hand corner of the constellation, the rotator 804 rotates the vectors 315°; for the cell in the lower, right hand corner of the constellation, the rotator 804 rotates the vectors 225°; for the cell in the lower, left hand corner of the constellation, the rotator 804 rotates the vectors 135°; and finally, for the cell in the upper, left hand corner, the rotator 804 rotates the vectors 45°.

To rotate the vectors, the rotator 804 may convert the coordinates of the end point of the vector, the datum point, to polar coordinates, adjust the angular coordinate, and convert the coordinates back to Cartesian coordinates. Another, and preferred, method for rotating the vectors is to multiply the vector by the matrix:

$$\begin{vmatrix} \cos\Theta & \sin\Theta \\ -\sin\Theta & \cos\Theta \end{vmatrix}$$

Where $\Theta$ is the angle through which the vector is to be rotated.

Having rotated all the vectors so that each cell's ideal vector would be vertical, the rotator 804 transmits the coordinates of the data points to the comparator 802. Deviations from the vertical axis, and deviations in the vertical direction from the ideal vector's end point indicate error in the signal. To determine if phase noise is present, the comparator 802 compares the error in the x-axis direction to the error in the y-axis direction.

The comparator 802 determines the error in the x-axis direction by determining the standard deviation of the x-coordinates of the rotated vectors. Because the rotator 804 rotated the ideal vectors to the y-axis, the x components of the rotated vectors for the data points are the deviations of the data points from the y-axis. The comparator 802 then determines the standard deviation of the difference between the y coordinate of each rotated vector and the y coordinate of the ideal, vertical vector. The comparator 802 then compares the standard deviation for the x direction to the standard deviation for the y direction according to the following inequality:

$$\sigma_x \geq C\sigma_y$$

Where $\sigma_y$ is the standard deviation in the vertical, or y direction, $\sigma_x$ is the standard deviation in the horizontal, or x direction, and C is a constant. C is preferably 1.5.

If the inequality is true, the comparator 802 generates a signal to the output device 608 indicative of the presence of phase noise. Output device 608 then generates a display or other output indicative of the presence of phase noise in the signal.

Figure 9:
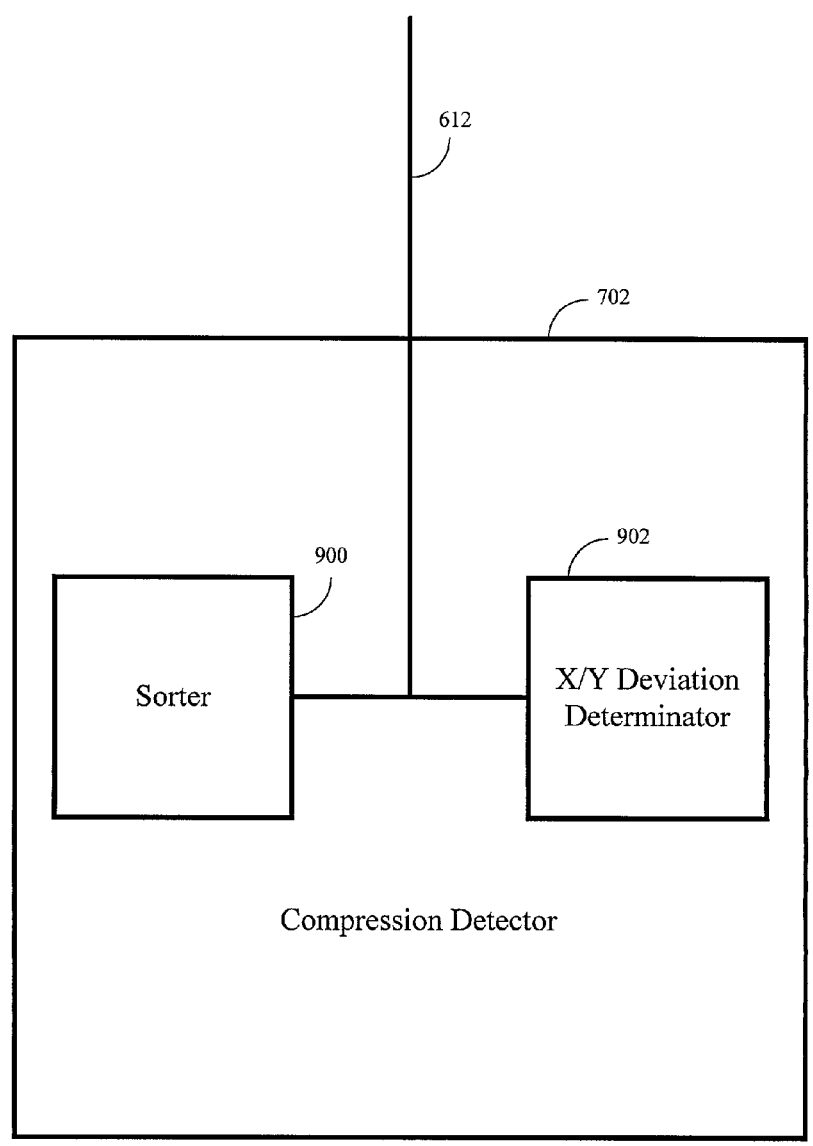
FIG. 9 is a block diagram of the compression detector of the present invention.

Referring now to FIG. 9 which shows the compression detector 702 of the present invention in greater detail. The compression detector 702 comprises a sorter 900 and an X/Y deviation determinator 902. The bus 612 couples the sorter 900 and the X/Y deviation determinator 902.

In the preferred embodiment, the sorter 900 accesses a constellation from the constellation storage 706. The sorter 900 then sorts the data points as describe above with reference to the sorter 800 of the phase noise detector 700. In an alternate embodiment the tester 600 may have a single sorter that the phase noise detector 700 and compression detector 800 share. The sorter 900 then transmits the data points that lie in the four corner cells, the cells farthest from the origin of the constellation, to the X/Y deviation determinator 902.

For each datum point that it receives from the sorter 900, the X/Y deviation determinator 902 determines the magnitude of the vector from the origin to the datum point. The X/Y deviation determinator 902 then uses the standard equation for the arithmetic mean to determine the average magnitude of all the vectors to all four cells. The X/Y deviation determinator 902 then determines the distance of the vector from the origin to the ideal data point for one of the cells. Because the X/Y deviation determinator 902 uses the four corner cells, the magnitude of the ideal vector is the same for each cell, and therefore, the X/Y deviation determinator 902 uses only one cell to calculate the magnitude of the ideal vector.

The X/Y deviation determinator 902 then evaluates the following inequality:

$$Z_{avg} <= CZ_{exp}$$

Where $Z_{avg}$ is the average vector magnitude for all the data points, C is a constant, and $Z_{exp}$ is the magnitude of the ideal vector. Preferably C is 0.98.

If the average magnitude of the vectors is such that the inequality is true, then the X/Y deviation determinator 902 generates a signal to the output device 608 to display an indication that compression is present in the signal on the network.

In an alternate and less preferred embodiment, the sorter 900 sorts the constellation into the 64 cells. The sorter 900 then selects 8 cells of the top or bottom row of cells. The sorter 900 then transmits the 8 cells to the X/Y deviation determinator 902. The X/Y deviation determinator 902 then calculates the average y component for each datum point in each cell. The X/Y deviation determinator 902 then determines if the following inequalities are true:

$$Y_{avg}[b_4] < Y_{avg}[b_3] < Y_{avg}[b_2] < Y_{avg}[b_1]$$

$$Y_{avg}[b_{-4}] < Y_{avg}[b_{-3}] < Y_{avg}[b_{-2}] < Y_{avg}[b_{-1}]$$

Where $b_4$ is the cell farthest from the y-axis and $b_1$ is the cell nearest the y-axis on the right hand side of the constellation. Similarly, $b_{-4}$ is the cell farthest from the y-axis and $b_{-1}$ is the cell nearest the y-axis on the left hand side of the constellation. In yet another alternate embodiment, the sorter 900 selects and transmits to the X/Y deviation determinator the cells in the column farthest from the y-axis, either to the left or to the right. Except for using the x coordinates in place of the y coordinates, the X/Y deviation determinator 902 detects compression in the manner described above.

If both inequalities are strictly true, compression is present. The inequalities must be strictly true, if one inequality within the total inequality is not true, then the entire inequality is not true. If the X/Y deviation determinator 902 detects compression, it transmits a signal to the output device 608 to display an indication of compression in the signal on the network.

Figure 10:
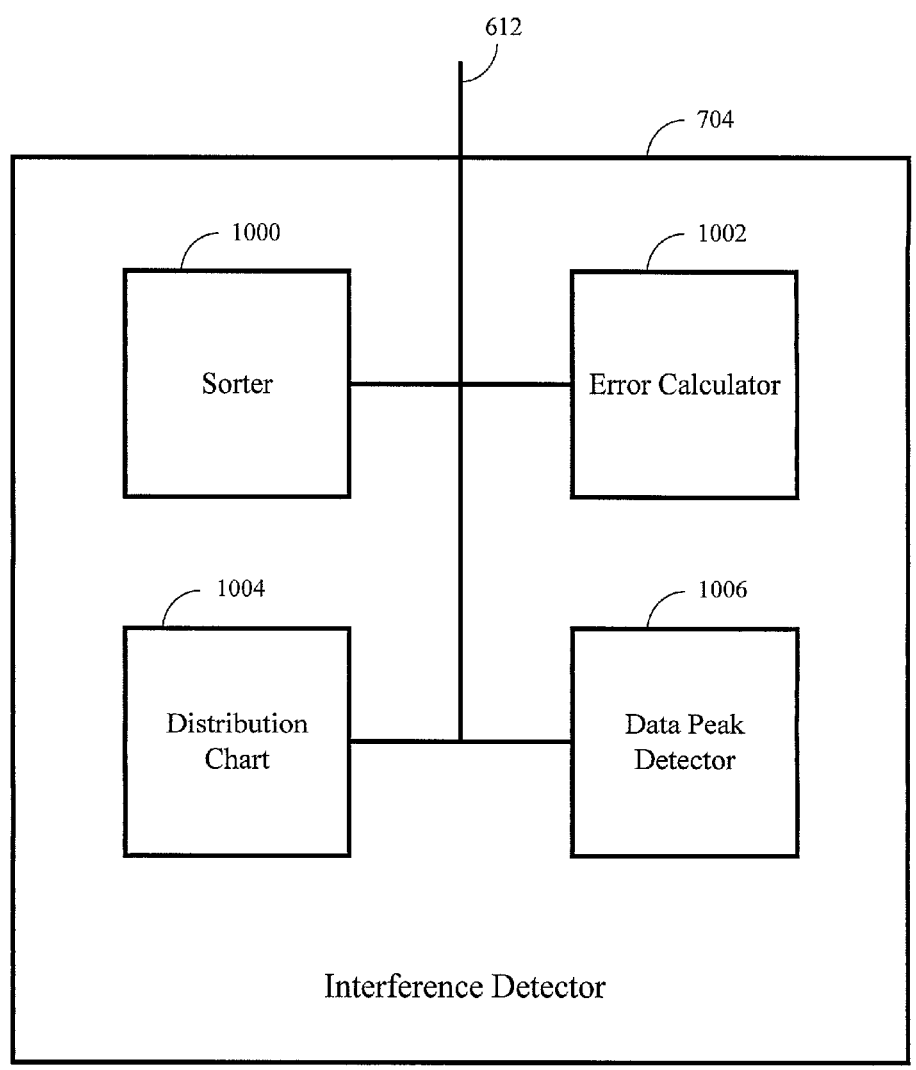
FIG. 10 is a block diagram of the interference detector of the present invention.

Referring now to FIG. 10 which illustrates the interference detector 704 in greater detail. The interference detector 704 comprises a sorter 1000, an error calculator 1002, a distribution chart 1004, and a data peak detector 1006. The sorter 1000, error calculator 1002, distribution chart 1004, and data peak detector 1006 are all coupled to bus 612.

The sorter 1000 is of the same type as sorter 900 of the compression detector 702 and sorter 800 of the phase noise detector 700. As was discussed above, in an alternate embodiment, the interference detector 704, compression detector 702, and the phase noise detector 702 may all share the same sorter. The sorter 1000 accesses a constellation from the constellation storage 706 and then sorts the constellation into its 64 cells. Having sorted the constellation, the sorter 1000 transmits the data points to the error calculator 1002. The error calculator 1002 determines an error value for each datum point of the constellation. The error value is the Euclidian distance between a datum point and the ideal point for the datum point's cell.

Once the error calculator 1002 determines an error value for each datum point, it transmits the error values to the distribution chart 1004. The distribution chart 1004 first creates framework for a histogram. The histogram is a chart where the x-axis represents error values and the y-axis represents numbers of data points. The x-axis is separated into bins which represent ranges of error values.

The distribution chart 1004 then places each error value received from the error calculator 1002 into the appropriate bin.

The height of a bin is proportional to the number of data points within it. Once the distribution chart 1004 finishes placing the error values into the histogram, the distribution chart 1004 transmits the histogram to the data peak detector 1006.

If there is no interference in the signal in the network, the histogram should appear as a gaussian distribution. The bin closest to the y-axis, the bin with the lowest error values, should contain the most data points. As the bins represent higher error values, the number of data points they contain should decrease.

The interference detector 704 detects two forms of interference, coherent and non-coherent. Coherent interference is present if the first or second bin, closest to the y-axis, is lower than a true gaussian distribution. Non-coherent interference is present if a peak exists away from the first bin and such peak is not caused by coherent interference.

The data peak detector 1006 first compares bins 1 & 2 to bin 3. If bin 1 or 2 is below bin 3, the data peak detector 1006 transmits a signal to the output device 608 indicating the presence of coherent interference. The output device 608 then generates an output indicative of the presence of coherent interference in the signal in the network.

When non-coherent interference is present in a signal, the distribution chart will not be a gaussian; it will have multiple peaks. The data peak detector 1006 next analyzes the bin to detect any that are greater than the bins to its left. If it detects such a bin, non-coherent interference may be present. The exception occurs when coherent interference is present, and bin 3 is greater than bins 1 and/or 2. If the data peak detector 1006 detects a peak that is out of place, and such peak is not caused by coherent interference, the data peak detector 1006 generates and transmits a signal to the output device 608 indicative of non-coherent interference. The output device 608 then generates a display indicative of non-coherent interference.

Figure 11A:
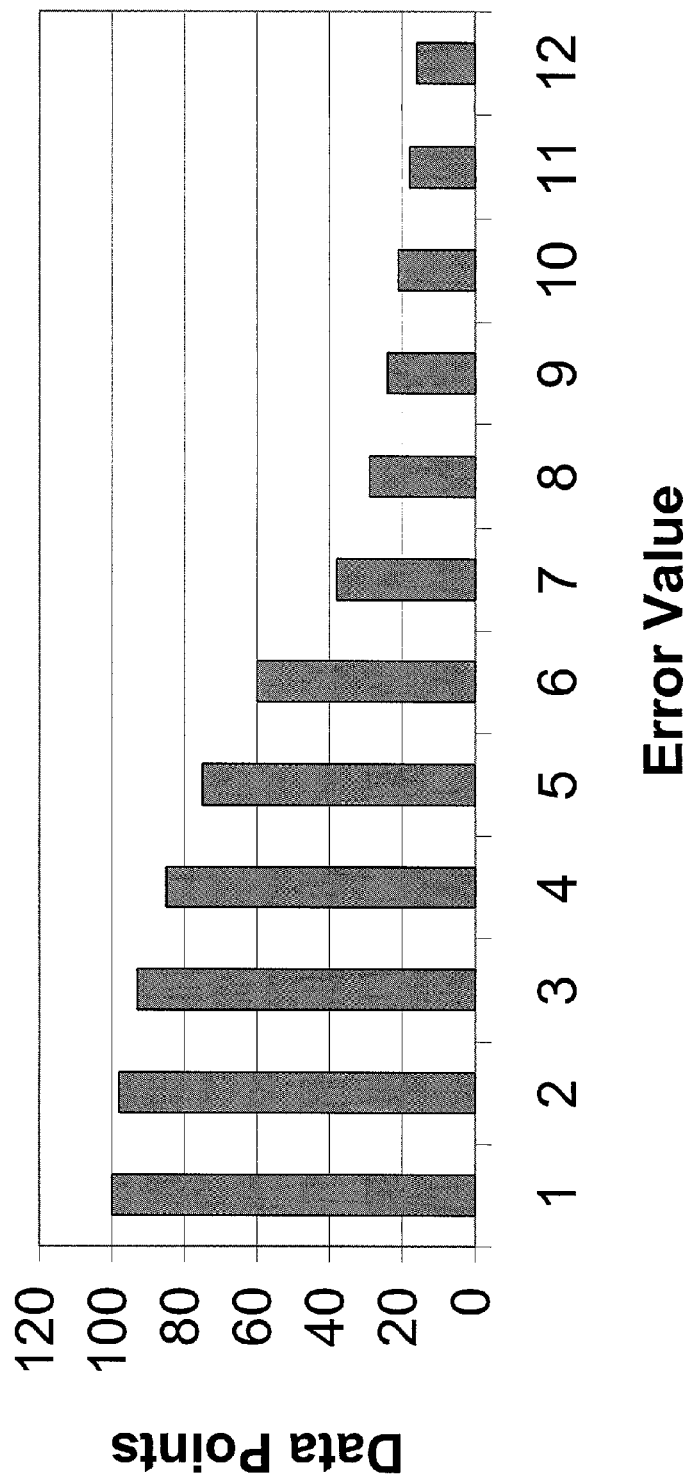
FIG. 11A shows the histogram without coherent or non-coherent interference in the signal.
Figure 11B:
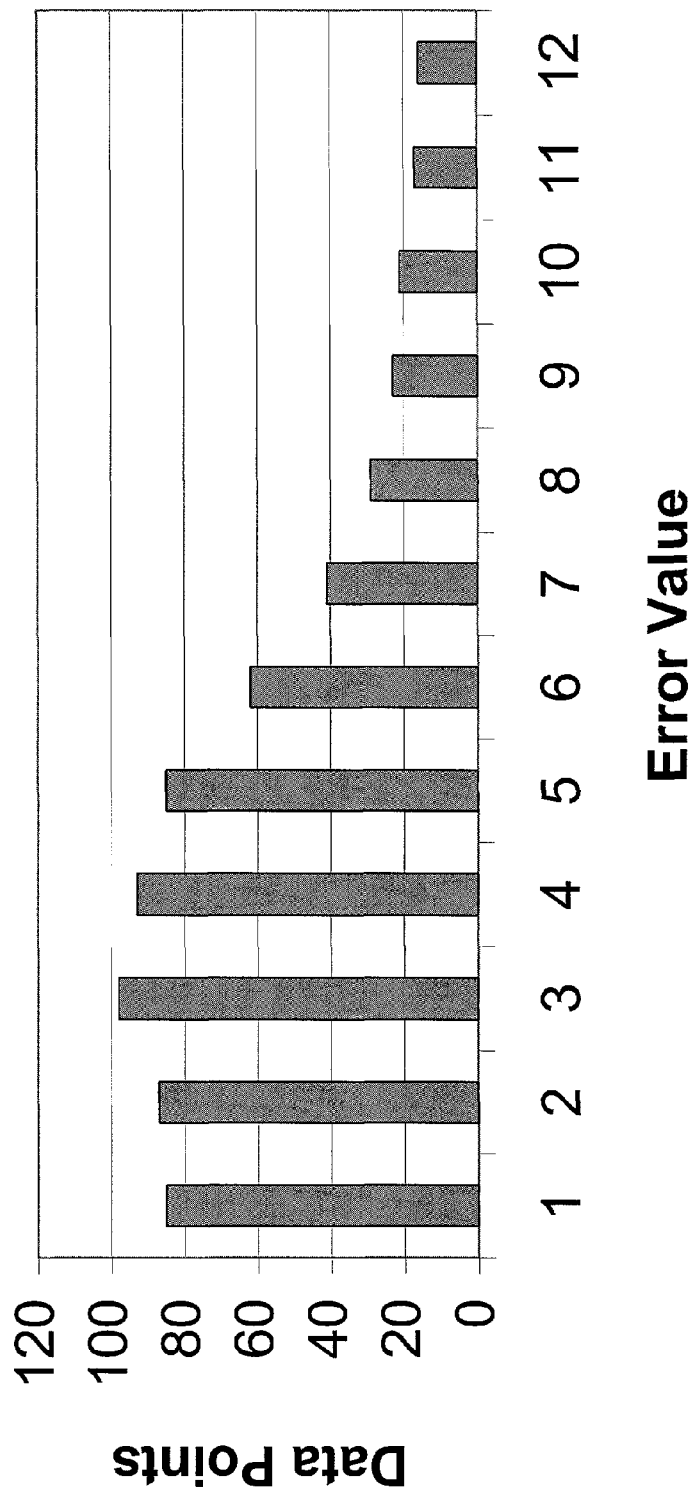
FIG. 11B shows the histogram with coherent interference in the signal.

FIG. 11A shows an exemplary histogram that the distribution chart 1004 may create. FIG. 11A shows a histogram for a signal without interference. In this exemplary histogram, the x axis is divided into 12 bins. The rectangles in the bins represent the number of data points in the bin. As a general rule, the number of bins depends on the resolution of the error values. Those of ordinary skill in the art will recognize how the distribution chart determines the number of bins.

Where there is no interference, the histogram has a gaussian shape and slopes downward to the right. FIG. 11B shows an exemplary histogram again of the type the distribution chart 1004 may create. The histogram in FIG. 11B shows coherent interference. Bin 3 contains the greatest number of data points. Where bins 1 or 2 are below bin 3, coherent interference is present.

Figure 11C:
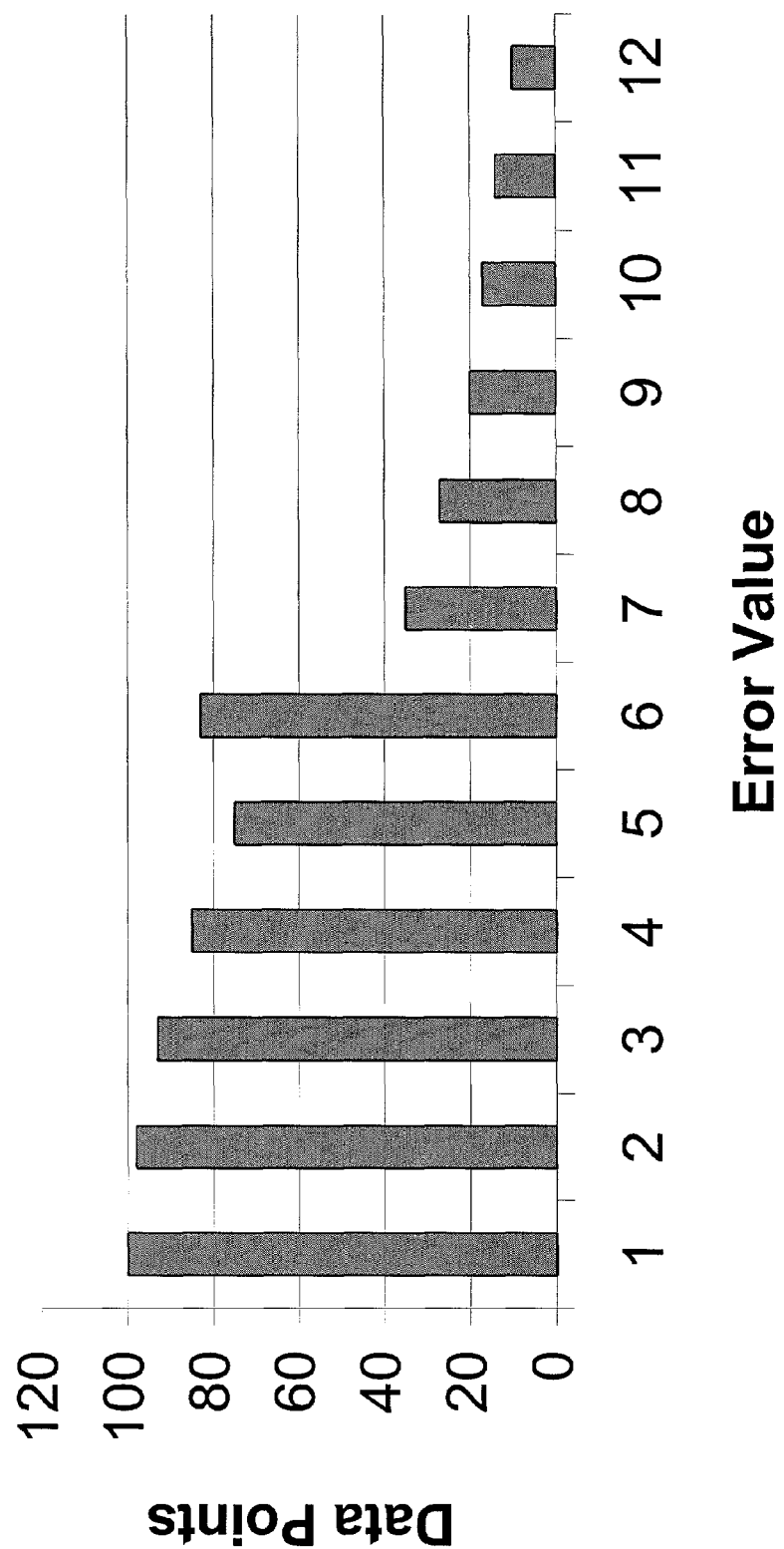
FIG. 11C shows the histogram with non-coherent interference in the signal.

Finally, FIG. 11C is an exemplary histogram that shows non-coherent interference. The exemplary histogram of FIG.

12C is again of the type the distribution chart 1004 may create. FIG. 11C indicates that coherent interference is not present, bins 1 & 2 are greater than bin 3, but bin 6 is a local peak. This local peak at bin 6 indicates non-coherent interference.

Figure 12:
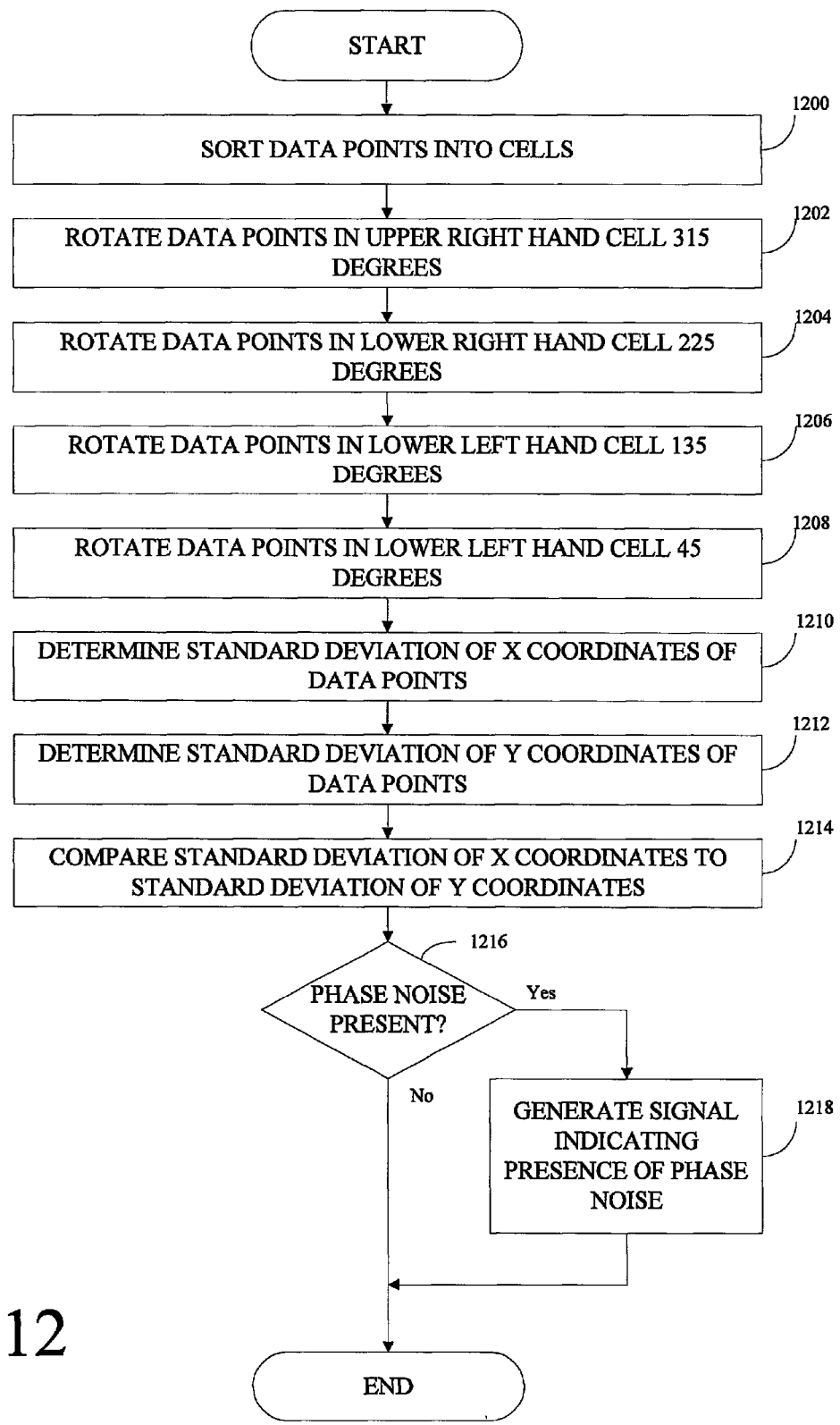
FIG. 12 is a flow chart of the preferred method for automatically detecting phase noise in a signal.

Referring now to FIG. 12 which illustrates the preferred method of the present invention for determining if phase noise is present in a signal. The method begins in step 1200 where the method sorts a constellation into 64 cells. If the method is applied to 256-QAM, it sorts the constellation into 256 cells. The method sorts the constellation by placing a grid over it. The grid is made up of 64 cells in an 8×8 matrix. Each cell represents one of the 64 symbols of 64-QAM, and the ideal point for each symbol is at the center of its corresponding cell. In step 1200 the method assigns each data point to the cell in which it lies.

In step 1202, the method selects the data points in the cell in the upper right hand corner of the constellation. For each datum point in the cell, the method constructs a vector from the origin to the datum point. The method then rotates the vectors 315°. This rotation is such that the ideal vector, the vector from the origin to the ideal point in the center of the cell, would be on the vertical, y axis after rotation. To rotate the vectors, the method preferably multiplies each vector by the matrix:

$$\begin{vmatrix} \cos\Theta & \sin\Theta \\ -\sin\Theta & \cos\Theta \end{vmatrix}$$

Where $\Theta$ is the angle through which the vector is to be rotated, here 315°.

An alternate and less preferred method to rotate the vectors is to convert the coordinates of the end points to polar coordinates, adjust the angular coordinate by 315°, and convert the coordinates back to Cartesian coordinates.

In step 1204, the method constructs vectors to each datum point in the lower right hand cell and rotates the resulting vectors 225°. This rotation is such that the ideal vector to the center of the lower right hand cell would be rotated to lie on the y axis. In step 1204, the method uses the same techniques to rotate the vectors as described for step 1202.

In step 1206, the method constructs vectors to each datum point in the lower right hand cell and rotates the resulting vectors 125°. This rotation is such that the ideal vector to the center of the lower right hand cell would be rotated to lie on the y axis. In step 1206, the method uses the same techniques to rotate the vectors as described for step 1202.

In step 1208, the method constructs vectors to each datum point in the lower right hand cell and rotates the resulting vectors 45°. This rotation is such that the ideal vector to the center of the lower right hand cell would be rotated to lie on the y axis. In step 1208, the method uses the same techniques to rotate the vectors as described for step 1202.

The method is seeking to determine the orthogonal deviations of the data points from the ideal points. Those of ordinary skill in the art will recognize that rotating the vectors simply eases the determination of the orthogonal deviations. Determining the orthogonal deviations and the deviations along the ideal vector without rotating is an equivalent method.

In step 1210, the method determines the deviation of the data points in the direction perpendicular to the ideal vectors. Having rotated the vectors in steps 1202, 1204, 1206 & 1208, the perpendicular deviations are simply the x coordinates of the end points of the vectors. Using the x coordinates, the method in step 1210 determines a measure of the deviations in the perpendicular direction. The measure is the standard deviation of the x coordinates.

In step 1212, the method determines a measure of the deviation of the data points from the ideal points in the direction of the ideal vector. Having rotated the vectors in steps 1202, 1204, 1206 & 1208, the deviation in the direction of the ideal vector of a datum point is now simply the difference between the y coordinated of the datum point's rotated vector and the y coordinate of the ideal vector. In step 1212, the method determines a measure of the deviations from the ideal points in the direction of the ideal vector by determining the standard deviation of the differences between the y coordinates of the data points' rotated vectors and the y coordinate of the rotated ideal vector.

In step 1214, the method compares the measure of perpendicular deviation to the measure of parallel deviation to determine if phase noise is present. To make the comparison, the method evaluates the inequality:

$$\sigma_x \ge C\sigma_y$$

Where $\sigma_y$ is the measure along the ideal axis determined in step 1212, and $\sigma_x$ is the measure perpendicular to the ideal axis determined in step 1210. C is a constant and is preferably 1.5.

In step 1216, the method determines if the inequality is true. If the inequality is true, the method, in step 1218, generates a signal indicative of the presence of phase noise, and the method ends. If, in step 1216, the inequality is false, the method ends.

Figure 13:
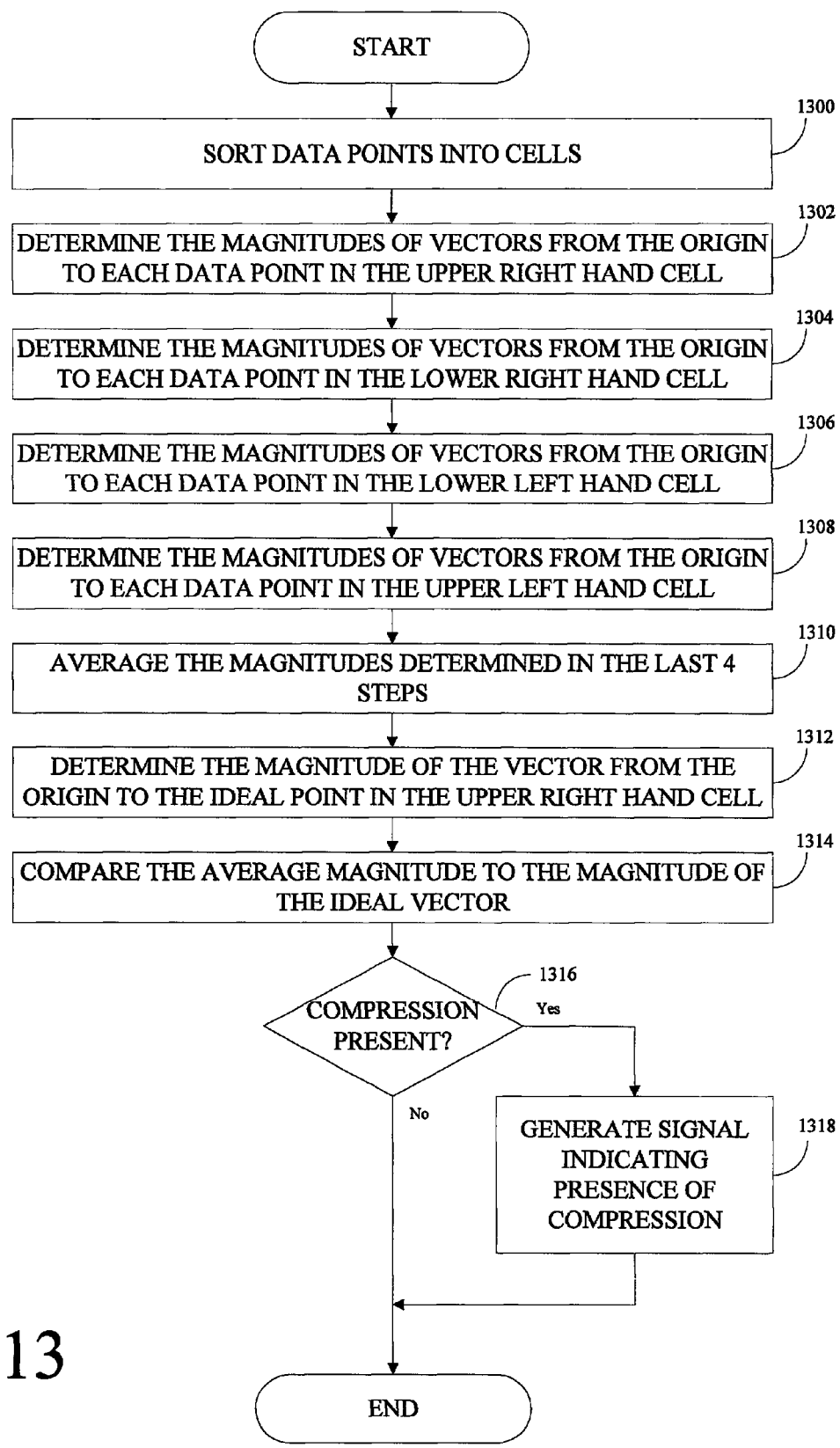
FIG. 13 is a flow chart of the preferred method for automatically detecting compression in a signal.

FIG. 13 is a flow chart of the preferred method for automatically determining if compression is present in a signal. The method starts in step 1300 where the method sorts the data points of a constellation into cells. The method uses the same technique as described for step 1200 with reference to FIG. 12 above. In step 1302, the method selects the data points in the cell in the upper right hand corner of the constellation and then determines the magnitude of the vectors from the origin to each of the data points. In step 1304, the method selects the data points in the cell in the lower right hand corner of the constellation and then determines the magnitude of the vectors from the origin to each of the datum points. In step 1306, the method selects the data points in the cell in the lower left hand corner of the constellation and then determines the magnitude of the vectors from the origin to each of the datum points. In step 1308, the method selects the data points in the cell in the upper left hand corner of the constellation and then determines the magnitude of the vectors from the origin to each of the datum points.

In step 1310, the method determines the average magnitude of all the magnitudes it determined in steps 1302, 1304, 1306 & 1308. In step 1312, the method determines the magnitude of the vector from the origin to the ideal point in the cell in the upper right hand corner. Those of ordinary skill in the art will realize that the method could determine the magnitude of the vector from the origin to any of the ideal points in the four corner cells. Those of ordinary skill in the art will also recognize that the magnitude of the ideal vector will be different for different levels of QAM, that is the magnitude of the ideal vector for 64-QAM is not equal to the magnitude of the ideal vector for 256-QAM.

The method in step 1313 compares the average vector magnitudes determined in step 1310 to the magnitude of the ideal vector determined in step 1312. The method uses the following inequality to compare the magnitudes:

$$Z_{avg} \le CZ_{exp}$$

Where $Z_{avg}$ is the average vector magnitude for all the data points, C is a constant, and $Z_{exp}$ is the magnitude of the ideal vector. Preferably C is 0.98.

The method determines, in step 1316, if the inequality is true. If the inequality is true, the method proceeds to step 1318 where it generates a signal indicative of the presence of compression in the signal in the network and the method ends. If, in step 1316, the inequality is false, the method ends.

Figure 14:
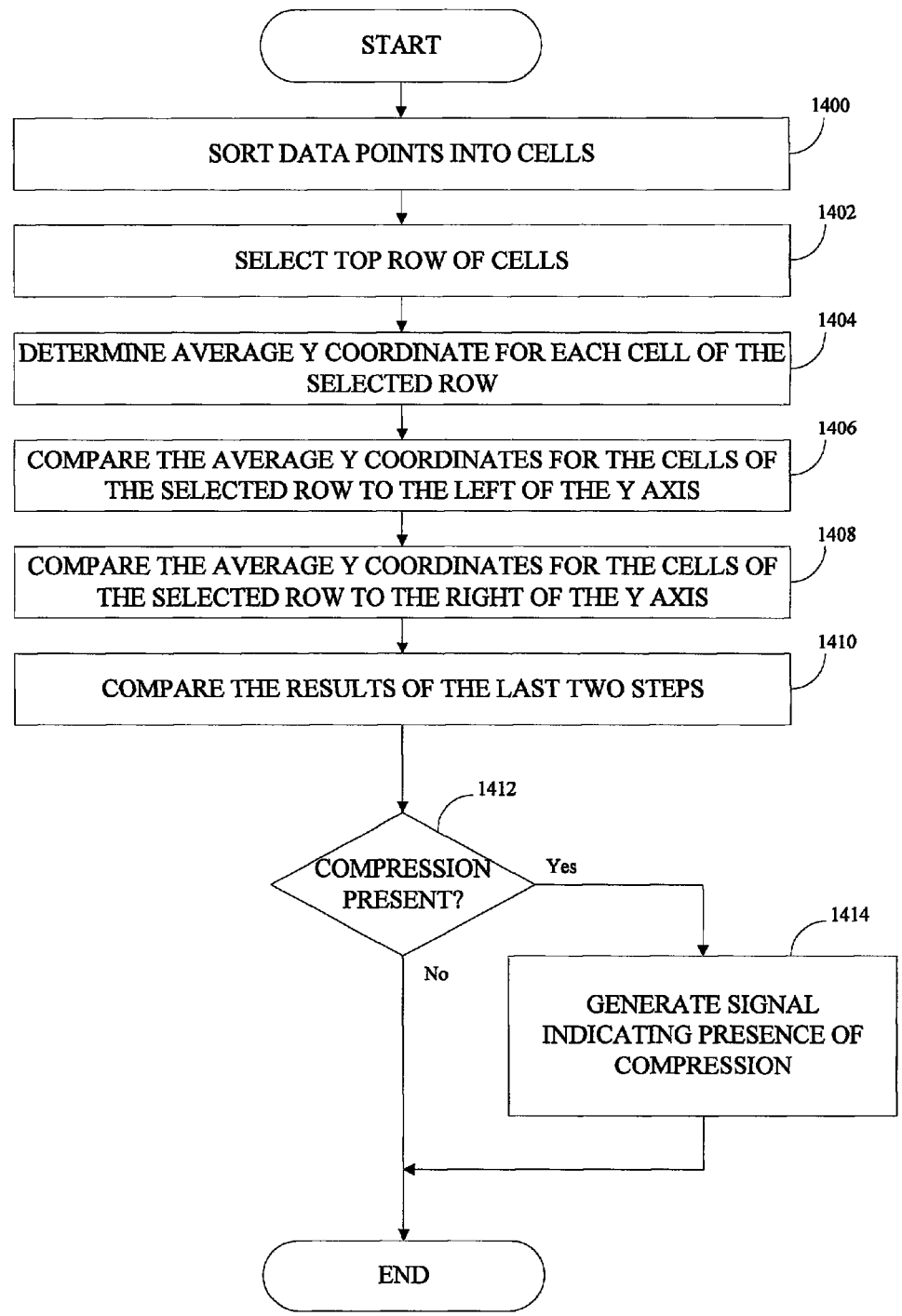
FIG. 14 is a flow chart of an alternate method for automatically detecting compression in a signal.

Reference is now made to FIG. 14 which shows an alternate, and less preferred, method for detecting the presence of compression in a signal on a network. The method begins in step 1400 where it sorts the data points of a constellation into 64 cells. The method uses the same technique described at step 1300 with reference to FIG. 13 above.

In step 1402, the method selects the top row of cells. Those of ordinary skill in the art will recognize that the method could alternatively select the bottom row of cells.

Next in step 1404, the method determines the average y coordinate of the data points. The method determines an average for each cell of the selected top row. In step 1406, the method selects the eight cells of the top row that lie to the left of the y axis. The method compares the averages according to the following extended inequality:

$$Y_{avg}[b_{-4}] < Y_{avg}[b_{-3}] < Y_{avg}[b_{-2}] < Y_{avg}[b_{-1}]$$

Where $b_{-4}$ is the cell farthest to the left of the y axis, $b_{-1}$, is the cell closest to the y axis on its left, and the other cells are arrayed between the according to their index. The inequality in step 1406 must be strictly true. If the average y coordinate for any cell is out of place in the inequality, the entire inequality is false.

In step 1408, the method selects the eight cells of the top row that lie to the right of the y axis. The method compares the averages according to the following extended inequality:

$$Y_{avg}[b_4] < Y_{avg}[b_3] < Y_{avg}[b_2] < Y_{avg}[b_1]$$

Where $b_4$ is the cell farthest to the right of the y axis, $b_1$ is the cell closest to the y axis on its right, and the other cells are arrayed between the according to their index. The inequality in step 1408 must be strictly true. If the average y coordinate for any cell is out of place in the inequality, the entire inequality is false.

Those of ordinary skill in the art will realize that yet another alternate method would use the x coordinates to determine the presence of compression. In this alternate method, the method would select the first or last column of the constellation. When averaging the coordinates, it would average the x coordinates instead of the y coordinates. Finally, the inequalities would arrange the average x coordinates according to the cells farthest from the x axis to closest to the x axis.

In step 1410, the method compares the two inequalities evaluated in steps 1406 & 1408. Only if both inequalities are strictly true is compression present.

The method then determines, in step 1412, whether compression is present. If compression is present, the method, in step 1414, generates a signal indicative of the presence of compression and the method ends. Otherwise, the method ends after step 1412.

Figure 15:
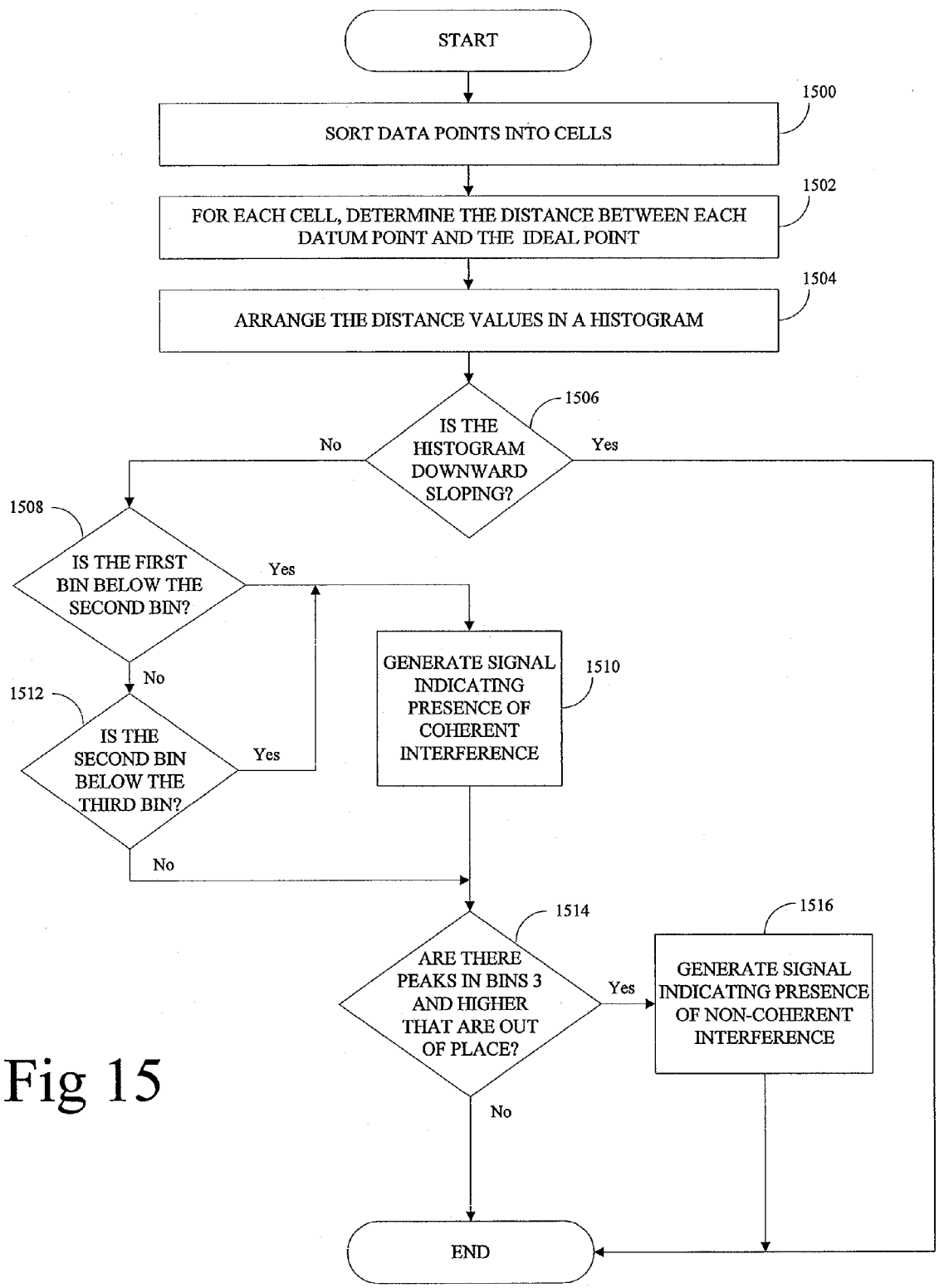
FIG. 15 is a flow chart of the preferred method for automatically detecting interference in a signal.

FIG. 15 illustrates the preferred method for automatically detecting interference in a signal on a cable network. The method begins in step 1500 where the method sorts the data points of a constellation into cells. The method uses the same technique described at step 1200 with reference to FIG. 12 above.

In step 1502, the method analyzes each cell for error values. An error value is the Euclidian distance between a datum point and the ideal point at the center of the cell. For every datum point of every cell, the method calculates an error value. In step 1504, the method arranges the error values in a histogram. For example, the method first constructs the framework for the histogram by selecting the largest error value. The method then divides the largest error value by number of bins in the histogram. The quotient is the range for each bin of the histogram. For example, if the largest error value is 10 and there are to be 10 bins, each bin would have a range of 1. The bins are arranged consecutively, following the above example, the first bin ranges from 0 to 1; the second bin ranges from 1 to 2; and continuing until the last bin ranges from 9 to 10. Those of ordinary skill in the art will recognize how to construct the histogram.

After constructing the histogram framework, the method, also in step 1504, places the error values in the histogram. The method places the error values in the bin for the range in which the error value falls. The method creates for each bin a rectangle that is proportional to the number of error values in the bin. FIG. 11A illustrates an exemplary histogram.

In step 1506, the method determines if the histogram indicates the presence of interference in the signal on the network. If no interference is present in the signal on the network, the histogram will appear to be gaussian; it will slope downward to the right. If the histogram is gaussian, the method ends.

If in step 1506 the histogram is not gaussian, the method continues in step 1508. In step 1508, the method determines if the first bin is below the second bin, if this is the case, coherent interference is present. If coherent interference is present, the method continues in step 1510 where a signal indicating the presence of coherent interference is generated.

If step 1508 does not indicate the presence of coherent interference, the method proceeds to step 1512 where bins 2 and 3 are compared. If bin 2 is below bin 3, coherent interference is present. If coherent interference is present, the method proceeds to step 1510.

From step 1510 or from step 1512 if coherent interference is not present, the method continues in step 1514. In step 1516, the method analyzes bins 3 and higher for peaks that are out of place for a gaussian distribution. If such a peak exists, non-coherent interference is present. If step 1514 detects non-coherent interference, the method proceeds to step 1516 where a signal indicative of the presence of non-coherent interference is generated. The method then ends.

If in step 1514 non-coherent interference is not present, the method ends.

We claim:

1. A device for detecting impairments in a digital quadrature amplitude modulated signal comprising:
    a phase noise detector comprising;
    a sorter;
    a rotator coupled to the sorter; and
    a comparator coupled to the rotator;
    a compression detector;
    an interference detector; and
    a constellation storage coupled to the phase noise detector, the compression detector, and the interference detector.

2. The device of claim 1 wherein the rotator rotates a vector utilizing a method comprising the steps of:
    converting the vector's end point coordinates into polar coordinates;
    adjusting the angle coordinate; and
    reconverting the end point coordinates to Cartesian coordinates.

3. The device of claim 1 wherein the rotator rotates a vector utilizing the matrix:

$$\begin{vmatrix} \cos\Theta & \sin\Theta \\ -\sin\Theta & \cos\Theta \end{vmatrix}.$$

4. The device of claim 1 wherein the comparator evaluates the inequality:

$\sigma_x >= G\sigma_y$.

5. The device of claim 4 wherein C=1.5.

6. The device of claim 1 wherein the compression detector comprises:
   a sorter; and
   an X/Y deviation determinator coupled to the sorter.

7. The device of claim 1:
   wherein the phase noise detector comprises:
   a rotator; and
   a comparator coupled to the rotator;
   wherein the compression detector comprises an X/Y deviation determinator; and
   wherein the phase noise detector and compression detector share a sorter coupled to the rotator and to the X/Y deviation determinator.

8. The device of claim 6 wherein the X/Y deviation determinator evaluates the inequality:

$Z_{avg} <= CZ_{exp}$.

9. The device of claim 8 wherein C=0.98.

10. The device of claim 6 wherein the X/Y deviation determinator analyzes a top row of cells of a constellation.

11. The device of claim 10 wherein the X/Y deviation determinator evaluates the inequalities:

$Y_{avg}[b_4] < Y_{avg}[b_3] < Y_{avg}[b_2] < Y_{avg}[b_1]$ and $Y_{avg}[b_{-4}] < Y_{avg}[b_{-3}] < Y_{avg}[b_{-2}] < Y_{avg}[b_{-1}]$.

12. The device of claim 6 wherein the X/Y deviation determinator analyzes a column of cells of a constellation.

13. The device of claim 1 wherein the interference detector comprises:
   a sorter;
   an error calculator coupled to the sorter;
   a distribution chart coupled to the error calculator; and
   a data peak detector coupled to the distribution chart.

14. A device for detecting impairments in a digital quadrature amplitude modulated signal comprising a phase noise detector, wherein the phase noise detector comprises:
   a sorter;
   a rotator coupled to the sorter wherein the rotator rotates a vector by utilizing a method comprising the steps of:
     converting the end point coordinates into polar coordinates;
     adjusting the angle coordinate; and
     reconverting the end point coordinates to Cartesian coordinates; and
   a comparator coupled to the rotator.

15. A device for detecting impairments in a digital quadrature amplitude modulated signal comprising a phase noise detector, wherein the phase noise detector comprises:
   a sorter;
   a rotator coupled to the sorter; and
   a comparator coupled to the rotator wherein the rotator rotates a vector utilizing the matrix:

$$\begin{vmatrix} \cos\Theta & \sin\Theta \\ -\sin\Theta & \cos\Theta \end{vmatrix}.$$

16. A device for detecting impairments in a digital quadrature amplitude modulated signal comprising a phase noise detector:
   wherein the phase noise detector comprises:
     a rotator; and
     a comparator coupled to the rotator;
   wherein the compression detector comprises an X/Y deviation determinator;
   wherein the interference detector comprises:
     an error calculator;
     a distribution chart;
     a data peak detector; and
   wherein the phase noise detector, compression detector, and interference detector share a sorter coupled to the rotator, to the X/Y deviation determinator, and to the error calculator.

17. A method for detecting compression in a digital quadrature amplitude modulated signal, the method comprising the steps of:
   sorting the symbols of the digital quadrature amplitude modulated signal into a constellation;
   selecting a sub-group of data points from the constellation;
   determining the magnitude of the vectors from the origin of the constellation to each datum point of the sub-group;
   determining the magnitude of a vector from the origin to an ideal point associated with the sub-group;
   comparing the magnitude of the vectors from the origin of the constellation to each datum point to the magnitude of the vector from the origin to the ideal point associated with the sub-group;
   determining from the comparison if compression is present; and
   generating a signal indicating compression in the digital quadrature amplitude modulated signal if the determining step indicates compression is present.

18. The method of claim 17 wherein the sub-group is a cell of the constellation.

19. The method of claim 17 wherein the sub-group is a cell in a corner of the constellation.

20. The method of claim 17 further comprising the step of averaging the magnitudes of the vectors from the origin of the constellation to each datum point of the sub-group.

21. The method of claim 18 further comprising the step of averaging the magnitudes of the vectors from the origin of the constellation to each datum point of the sub-group.

22. The method of claim 19 further comprising the step of averaging the magnitudes of the vectors from the origin of the constellation to each datum point of the sub-group.

23. The method of claim 20 wherein the comparing step evaluates the inequality:

$Z_{avg} <= CZ_{exp}$.

24. The method of claim 23 wherein C=0.98.

25. A method for detecting compression in a digital quadrature amplitude modulated signal, the method comprising the steps of:
sorting the symbols of the digital quadrature amplitude modulated signal into a constellation;
selecting more than one sub-group of data points from the constellation;
analyzing each datum point according to its selected sub-group;
comparing the analyzed data points for each sub-group to the analyzed data points of every other selected sub-group;
determining from the comparison if compression is present; and
generating a signal indicating compression in the digital quadrature amplitude modulated signal if the determining step indicates compression is present.

26. The method of claim 25 wherein the selecting step selects more than one cell of the constellation.

27. The method of claim 25 wherein the analyzing step averages a coordinate of each datum point according to its sub-group.

28. The method of claim 27 wherein the averaging is according to each selected cell of the constellation.

29. The method of claim 26 wherein the selected cells constitute a row of the constellation.

30. The method of claim 29 wherein the selected cells constitute the top row of the constellation.

31. The method of claim 29 wherein the selected cells constitute the bottom row of the constellation.

32. The method of claim 29 wherein the selected cells constitute a column of the constellation.

33. The method of claim 29 wherein the comparing step evaluates the inequalities:

$$Y_{avg}[b_4] < Y_{avg}[b_3] < Y_{avg}[b_2] < Y_{avg}[b_1]$$

and $$Y_{avg}[b_{-4}] < Y_{avg}[b_{-3}] < Y_{avg}[b_{-2}] < Y_{avg}[b_{-1}].$$

34. A method for detecting non-coherent interference in a digital quadrature amplitude modulated signal, the method comprising the steps of:
sorting the symbols of the digital quadrature amplitude modulated signal into a constellation;
detecting an error signal for one or more data points of the constellation;
arranging the detected error signals;
detecting non-coherent interference from the arranged, detected error signals; and
generating a signal indicating non-coherent interference in the digital quadrature amplitude modulated signal if the detecting step indicates compression is present.

35. The method of claim 34 wherein:
the sorting step includes sorting data points into cells of the constellation; and
the detecting an error signal step includes determining the Euclidian distance between a datum point and the ideal point associated with the datum point's cell.

36. The method of claim 35 wherein the arranging step includes constructing a histogram according to the error signals detected in the detecting step.

37. The method of claim 36 wherein the step of detecting non-coherent interference from the arranged, detected error signals includes detecting one or more peaks in the histogram that are indicative of non-coherent interference.

38. A device for detecting impairments in a digital quadrature amplitude modulated signal comprising:
means for detecting phase noise comprising;
means for sorting one or more digital quadrature amplitude modulated signal symbols;
means for rotating data points such rotating means coupled to the sorting means; and
means for comparing rotated data points such comparing means coupled to the rotating means;
means for detecting compression;
means for detecting interference; and
means for storing a constellation storage such storage means coupled to the phase noise detection means, the compression detection means, and the interference detection means.

39. The device of claim 38 wherein the comparator means evaluates the inequality:

$$\sigma_x \geq C\sigma_y.$$

40. The device of claim 38 wherein C=1.5.

41. The device of claim 38 wherein the compression detection means comprises:
means for sorting one or more digital quadrature amplitude modulated signal symbols; and
means for determining X/Y deviations such means coupled to the sorting means.

42. The device of claim 41 wherein the X/Y deviation determining means evaluates the inequality:

$$Z_{avg} \leq CZ_{exp}.$$

43. The device of claim 42 wherein C=0.98.

44. The device of claim 41 wherein the X/Y deviation determining means analyzes a top row of cells of a constellation and evaluates the inequalities:

$$Y_{avg}[b_4] < Y_{avg}[b_3] < Y_{avg}[b_2] < Y_{avg}[b_1]$$

and $$Y_{avg}[b_{-4}] < Y_{avg}[b_{-3}] < Y_{avg}[b_{-2}] < Y_{avg}[b_{-1}].$$

45. The device of claim 38 wherein the interference detector comprises:
means for sorting one or more digital quadrature amplitude modulated signal symbols;
means for detecting an error signal coupled to the sorting means;
a distribution chart coupled to the error detection means; and
means for detecting peaks coupled to the distribution chart.

46. A device for detecting impairments in a digital quadrature amplitude modulated signal comprising means for detecting interference wherein the interference detection means comprises:
means for sorting one or more digital quadrature amplitude modulated signal symbols;
means for detecting an error signal coupled to the sorting means;
a distribution chart coupled to the error detection means; and
means for detecting peaks coupled to the distribution chart.

47. A device for detecting compression in a digital quadrature amplitude modulated signal comprising:
means for sorting the symbols of the digital quadrature amplitude modulated signal into a constellation;
means for selecting a sub-group of data points from the constellation;
means for determining the magnitude of the vectors from the origin of the constellation to each datum point of the sub-group;

means for determining the magnitude of a vector from the origin to an ideal point associated with the sub-group;

means for comparing the magnitude of the vectors from the origin of the constellation to each datum point to the magnitude of the vector from the origin to the ideal point associated with the sub-group;

means for determining from the comparison if compression is present; and means for generating a signal indicating compression in the digital quadrature amplitude modulated signal if the determining means indicates compression is present.

48. The device of claim 47 further comprising means for averaging the magnitudes of the vectors from the origin of the constellation to each datum point of the sub-group.

49. The device of claim 48 wherein the comparing means evaluates the inequality:

$$Z_{avg} <= CZ_{exp}.$$

50. A device for detecting compression in a digital quadrature amplitude modulated signal comprising:

means for sorting the symbols of the digital quadrature amplitude modulated signal into a constellation;

means for selecting more than one sub-group of data points from the constellation;

means for analyzing each datum point according to its selected sub-group;

means for comparing the analyzed data points for each sub-group to the analyzed data points of every other selected sub-group;

means for determining from the comparison if compression is present; and means for generating a signal indicating compression in the digital quadrature amplitude modulated signal if the determining means indicates compression is present.

51. The device of claim 50 wherein the analyzing means averages a coordinate of each datum point according to its sub-group.

52. The device of claim 51 wherein the comparing means evaluates the inequalities:

$$Y_{avg}[b_4] < Y_{avg}[b_3] < Y_{avg}[b_2] < Y_{avg}[b_1]$$

and $$Y_{avg}[b_{-4}] < Y_{avg}[b_{-3}] < Y_{avg}[b_{-2}] < Y_{avg}[b_{-1}].$$

53. A device for detecting non-coherent interference in a digital quadrature amplitude modulated signal comprising:

means for sorting the symbols of the digital quadrature amplitude modulated signal into a constellation;

means for detecting an error signal for at least one datum point of the constellation;

means for arranging the detected error signals;

means for detecting non-coherent interference from the arranged, detected error signals; and means for generating a signal indicating non-coherent interference in the digital quadrature amplitude modulated signal if the detection means indicates compression is present.

54. The device of claim 53 wherein:

the sorting means includes means for sorting data points into cells of the constellation; and the detection means includes means for determining the Euclidian distance between a datum point and the ideal point associated with the datum point's cell.

* * * * *